July 4, 1944.  E. P. BARRETT ET AL  2,352,932
ABSORBENT
Filed April 3, 1942
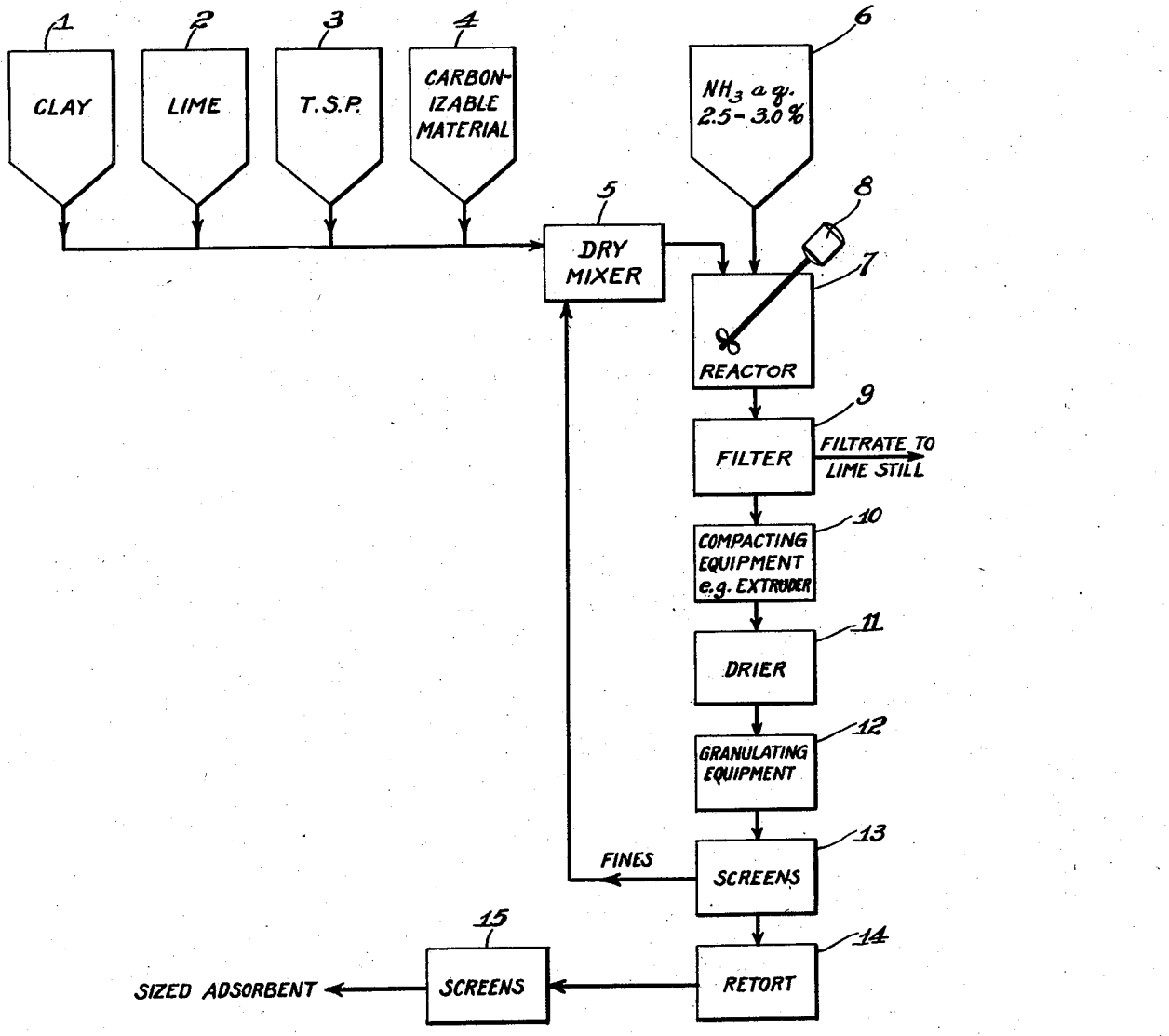
INVENTORS
Elliott P. Barrett
James R. West
BY Brown, Critchlow & Flick
Their ATTORNEYS.

Patented July 4, 1944

2,352,932

UNITED STATES PATENT OFFICE 2,352,932

ADSORBENT

Elliott P. Barrett and James R. West, Pittsburgh, Pa.

Application April 3, 1942, Serial No. 437,508

19 Claims. (Cl. 252—265)

This invention relates to granular adsorbents, particularly for use in sugar refining and other purification treatments.

For over a century bone black, sometimes termed bone char or animal charcoal, has been the standard adsorbent used in the purification of raw sugar for the removal of color and ash-forming mineral matter. Two primary criteria for such a material are the ability to remove color and the ability to remove ash; additionally a sugar refining adsorbent should possess alkaline buffering power, i. e., it must be capable of keeping the raw sugar solution below the hydrogen ion concentration which will be productive of substantial amounts of invert sugar. The bulk density and the resistance to crushing and abrasion, commonly termed hardness, are important factors which also determine the suitability of adsorbents.

Much of the bone which is used for making bone black has come from South America. At the present time it is difficult or impossible for bone from foreign sources to reach this country, so that the supply of the standard adsorbent used for sugar refining is threatened.

For many years clays, in both granular and pulverized form, have been used for certain decolorizing treatments, largely in the petroleum industry, because of their cheapness. The clay adsorbents available heretofore have been unsatisfactory for sugar refining because the activating procedures applied to prepare them for use have not developed satisfactory ash removal power or satisfactory alkaline buffering power. Also, such clay adsorbents may, and commonly do, lack sufficient decolorizing power for use in sugar refining.

Methods for measuring the properties of sugar purifying adsorbents have never been standardized, but all commonly used methods are of the same general character. The particular functions as referred to herein are determined by the following procedures.

*Decolorizing power.*—100 grams of adsorbent screened to pass 10-mesh and remain on 28-mesh (Tyler standard sieve screens) are placed in a 500 cc. Erlenmeyer flask with 10 grams of diatomaceous earth filter aid. 200 cc. of 47.5° Brix raw sugar solution, previously clarified by filtration with filter aid, are added to the flask which is then placed in a water bath maintained at 75° C. The flask is shaken every half hour until 4 hours have elapsed when it is removed from the water bath, cooled to room temperature and filtered. The percentage of color removed is determined by a colorimetric comparison of the filtrate from the adsorbent with the filtrate from a blank treated, in all respects, as was the solution in contact with the adsorbent, except that the blank contains filter aid but no adsorbent.

*Ash removal power.*—10 cc. of the filtrate from the decolorization test are placed in a weighed crucible and the solution concentrated at a temperature of 80° to 90° C. The concentrate is treated with 1 to 2 cc. of concentrated sulfuric acid and heated on a hot plate until the residual moisture is expelled. The crucible is then placed in a furnace and heated to a temperature of 700° to 750° C. It is then removed from the furnace and cooled to room temperature. The residue is moistened with sulfuric acid and again ignited in the furnace to 700° to 750° C. The crucible, plus residue, is weighed when cool. Per cent ash removed is then calculated from the relationship:

$$\text{Per cent ash removed} = \frac{(\text{Blank ash weight} - \text{Sample ash weight}) \; 100}{\text{Blank ash weight}}$$

*Alkaline buffering power.*—The pH of a portion of the filtrate from the test of decolorizing power is measured with a glass electrode pH meter. With raw sugar solutions showing an initial pH of 5.8 to 6.2 bone black will produce a filtrate having a pH of 7.2 to 7.6. A filtrate pH of 6.8 under the test conditions indicates that the buffering power of the adsorbent is about the minimum acceptable for use under refinery conditions.

*Bulk density.*—The weight of a cubic foot of bone black loose packed, i. e., not settled into the container by shaking or jarring, averages about 40 pounds. A substitute should have at least as high a density. A higher density is advantageous.

*Hardness.*—110 grams of adsorbent are placed in a 10-mesh Tyler standard sieve screen which is nested on a 28-mesh Tyler standard sieve screen which, in trun, is nested on a receiving pan. A screen cover is placed over the 10-mesh screen and the nest of screens is shaken in a ro-tap machine for 5 minutes. Exactly 100 grams of the portion so obtained (through 10, on 28-mesh) are placed in the receiving pan with 100 grams of steel ball-bearings ¼ inch in diameter, the pan is covered, placed in the ro-tap machine and shaken for 10 minutes without the use of the mechanical tapper. The adsorbent is then separated from the steel balls, placed on the 28-mesh screen and ro-tapped for 5 minutes. The weight (in grams) of adsorbent remaining on the 28-mesh screen is defined as hardness, in per cent.

It is among the objects of this invention to provide a new adsorbent material which is relatively cheap and efficient in action, is composed largely of clay, and may be used satisfactorily in place of bone black for refining raw sugar solutions.

Another object is to provide a method of activating clay to produce adsorbent material.

Still another object is to provide a clay adsorbent which possesses power to decolorize and to remove ash from raw sugar solutions at least equal to that of bone black, and which possesses adequate buffering power.

Other objects will be understood from the following specification.

The accompanying drawing is a flow sheet illustrative of the preferred embodiment of the invention.

The invention is predicated on our discovery that efficient clay-base adsorbents are produced by forming a basic calcium phosphate in contact with clay and a carbonizable material under conditions to produce a homogeneous mixture of the three, and heating the mixture to carbonize the carbonizable material and to cause bonding to occur.

The calcium phosphates which, according to the literature, can be precipitated from aqueous solution are described by the following generalized equations:

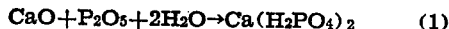
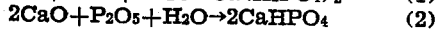
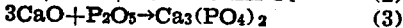
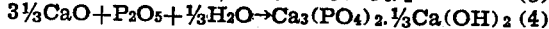

$$CaO + P_2O_5 + 2H_2O \rightarrow Ca(H_2PO_4)_2 \quad (1)$$
$$2CaO + P_2O_5 + H_2O \rightarrow 2CaHPO_4 \quad (2)$$
$$3CaO + P_2O_5 \rightarrow Ca_3(PO_4)_2 \quad (3)$$
$$3\tfrac{1}{3}CaO + P_2O_5 + \tfrac{1}{3}H_2O \rightarrow Ca_3(PO_4)_2 \cdot \tfrac{1}{3}Ca(OH)_2 \quad (4)$$

We have found that for the purposes of the present invention it is necessary that the calcium phosphate which is formed in contact with the clay must be at least as alkaline as hydroxyapatite, the reaction product of Equation 4, and most suitably it is more alkaline than that material. Analysis of satisfactory adsorbents made in accordance with the present invention indicates that the phosphate present in those products is calcium oxyphosphate, which could be produced by the generalized reaction

$$4CaO + P_2O_5 + H_2O \rightarrow Ca_3(PO_4)_2 \cdot Ca(OH)_2 \quad (5)$$

followed by heating to expel the combined water.

Whether or not the calcium phosphate formed in the practice of the present invention has a higher ratio of calcium hydroxide to tri-calcium phosphate than in hydroxyapatite, we have discovered that by following the practice described there are produced adsorbents having the alkaline buffering action and power to remove ash and coloring matter requisite in sugar purifying adsorbents. It is essential to the invention that the basic phosphate be formed in contact with the clay because, as we have found, mere mechanical mixtures of clay and preformed calcium or ammonium phosphates do not possess the adsorbent and other properties which characterize the products of this invention. The phosphates used in the practice of this invention are formed by precipitation on the clay and carbonizable material. This can be done in various ways, suitably by reacting a calcium compound and phosphoric acid or a reactive phosphate in contact with the other ingredients of the adsorbent. Most suitably this is accomplished in the case of phosphoric acid by suspending the clay and the carbonizable material in a dilute alkaline solution to which the reactants are added. Also, the phosphates may be formed from various materials.

As sources of calcium oxide we have used burnt lime (CaO), hydrated lime (Ca(OH)$_2$), calcium carbonate (CaCO$_3$), and calcium sulfate (gypsum—CaSO$_4$.2H$_2$O). As sources of P$_2$O$_5$, orthophosphoric acid (H$_3$PO$_4$), primary calcium phosphate (Ca(H$_2$PO$_4$)$_2$), secondary calcium phosphate (CaHPO$_4$), treble superphosphate and ordinary superphosphate have been used. Inasmuch as the various calcium compounds supply CaO, and the acid or phosphates supply P$_2$O$_5$, they are referred to generically in the claims, for conciseness, as available lime and available phosphate, which terms are to be understood as including the reactants used to form the phosphate. The exact materials to be used will depend on costs and convenience of operation. For example, phosphoric acid, primary calcium phosphate and treble superphosphate react relatively rapidly with lime. From the cost standpoint, however, phosphoric acid and primary calcium phosphate are unduly expensive, but treble superphosphate is of moderate cost and it is economically feasible to use it at present. Ordinary superphosphate is still cheaper but contains calcium sulphate in large amounts. The conversion of calcium sulphate to tricalcium phosphate-calcium hydroxide compounds of the sort indicated in Equations 4 and 5 proceeds very slowly in comparison to the reaction of lime with treble superphosphate, and the lower cost of the ordinary superphosphate must be weighed against the time saved by using treble superphosphate.

Although clays in general are applicable in the practice of the invention, it is preferred to use those which are not of great refractoriness, and we believe this to be desirable because the desired mechanical strength of the adsorbents can be produced by firing at relatively low temperatures. Plastic clays of moderate refractoriness, such as the Kentucky ball clays, are particularly adapted to the purposes of the invention. For many purposes we prefer that the iron oxide content of the clay should be low.

The carbon present in the adsorbent can be supplied in various ways. We now prefer to form it throughout the adsorbent by carbonization of a carbonizable organic material, as will appear more fully hereinafter. There might be used for such purposes pitches or the like hydrocarbons, but we have found that, in general, it is more desirable to use such carbonizable materials as starch, soybean meal, dried blood, and the like protein or carbohydrate materials. The lignitic matter present in some clays, such as the Kentucky ball clays, may be used to supply carbon, so that it is not necessary to add carbonizable matter, and if the content of lignitic matter is high the clay may be blended with others to provide the desired amount.

The proportions in which the various materials are used will vary, as will be understood in the art, according to the particular clays, carbonizable materials and reactants used, and also upon the properties desired in the adsorbent. However, we prefer for sugar refining that the ratio of CaO added to P$_2$O$_5$ present shall be at least 3 mols to 1 mol, and it may be as high as 4 to 1, and preferably the sum of the total CaO and P$_2$O$_5$ present should be about 30 per cent by weight of the total inorganic matter present in the batch. An increase in the buffering action of the product is generally to be had by increasing the proportion of the CaO-plus-$P_2O_5$, but too high a proportion may result in reduced strength or hardness of the fired product. The $CaO:P_2O_5$ ratio preferred corresponds to the oxyphosphate. We prefer also that the batch should contain sufficient organic matter to impart to the product a carbon content of at least about 4 per cent; more may be used, but too high a content of carbon may render the adsorbent too weak mechanically for some uses.

In the practice of the invention, therefore, available lime and available phosphate are reacted in the presence of clay and carbonizable material to produce the basic phosphate. Most suitably the reaction is performed in a water suspension of the clay and the carbonizable organic material, as by dry mixing the solid ingredients and dispersing them in an aqueous solution of the water-soluble ingredients.

To precipitate a basic phosphate which gives the adsorbent adequate alkaline buffering power for sugar refining, the reaction should be carried out in the presence of an alkali. Dilute solutions suffice for this purpose, and although any alkali might be used it is preferred to use ammonium hydroxide for this purpose. Solutions containing about 2.5 to 3 per cent of $NH_3$ are generally satisfactory. Stronger concentrations may be used, and in some cases this may be desirable as it seems to increase ash removing power.

It is highly desirable that the phosphate be precipitated or distributed uniformly with the organic material throughout the clay mass, and the mixture is therefore agitated to produce a homogeneous product. When the reaction has been completed the solid matter is separated from the liquid, as by filtration.

An essential feature of the invention resides in complete removal of water-soluble matter from the filter cake at this stage because we have found that the ash removal power is impaired if water-soluble matter remains, and that this can not be corrected by washing of the final product. Accordingly the cake is washed with water or dilute ammonia to the extent indicated. It is for this reason that we prefer ammonia as the alkali; other alkalies, such as sodium hydroxide, are much more difficult to remove completely.

The washed cake may then be dried and fired. For most purposes it is desirable, although not essential, preliminarily to compact the material into shapes or granules, most suitably after drying to an extent such as to facilitate that operation. The granules may then be fired in the substantial absence of air, as in retorts, to carbonize the organic matter and to develop the bonding properties of the clay. The material must not be heated to a temperature which causes the clay to vitrify, however, because that will adversely affect the properties of the product. For example, if vitrifaction occurs the material not only loses its color removing power but may actually add color to solutions to which it is added. Subject to these factors the temperature may be varied. We have had satisfactory results, for example, by firing at temperatures from 650° C. to 950° C., but for sugar refining adsorbents we prefer to fire at about 750° C.

The preferred embodiment of the invention may be described further with reference to the accompanying flow sheet. Kentucky ball clay, ground to 60-mesh or finer, from container 1, finely divided hydrated lime from container 2, ground treble super-phosphate from container 3 and carbonizable material, e. g., starch from container 4 are supplied to a dry mixer 5 in which they are mixed in the proportions set forth hereinabove as preferred for making adsorbents for sugar refining. Additional grinding as well as mixing may be accomplished at this point. Part of the charge may consist of fines from the screens 13. Aqua ammonia, 3 per cent, is supplied from storage tank 6 to reactor 7 and the dry mixed raw materials added, with stirring, in the proportion, in this instance, of 400 pounds of dry raw materials to 1000 pounds of aqua ammonia.

The contents of the reactor are thoroughly agitated by suitable agitating means 8 to produce intimate mixing and precipitation of the basic calcium phosphate homogeneously throughout the clay body. When the reaction has been completed the slurry is discharged to a filter 9, and the cake is washed thoroughly to remove all water-soluble material. The filtrate and the more concentrated wash water are passed to a still, not shown, where they are treated with lime and the $NH_3$ distilled off and recovered to regenerate the solution in container 6. The filter cake is passed to the compacting mechanism 10, which may comprise extrusion means, forming rolls, or other compacting means. From the compacting mechanism the material passes to a drier 11, thence to granulating or crushing equipment 12, from which it passes to screens 13, the fines being returned to process at the dry mixer 5. The sized material is passed to a retort 14 in which it is heated to about 750° C. in the substantial absence of air. From the kiln the fired material is passed to a screen or other classifier 15 to separate one or more fractions of desired particle size.

The following examples are illustrative of the possible variations and of the results to be had.

*Example 1.*—110 grams of dried and ground ball clay were mixed with 25 grams of burnt lime and 20 grams of starch. The mixture was dispersed in a liter of about 2 per cent ammonia solution in a container provided with a mechanical stirrer. To this dispersion 45 grams of 85 per cent phosphoric acid were added and stirring was continued for half an hour. The slurry was then filtered and the filter cake washed with two liters of water. The filter cake was dried, crushed and screened to obtain the 10 x 28-mesh portion. This portion was heated in an alloy steel retort to 750° C. and maintained at that temperature for one hour. The retort was then removed from the furnace and allowed to cool, after which the product was removed and screened to remove the small amount of undersize produced in the retorting operation.

*Example 2.*—240 grams of ball clay were mixed with 65 grams of lime, 97.6 grams of monocalcium phosphate monohydrate and 40 grams of starch. The mixture was dispersed, with the aid of mechanical stirring, in a liter of water containing about 2.8 per cent of ammonia and stirring was continued for one hour. The filtration, washing, drying, crushing, screening and retorting operations were conducted as in Example 1.

To illustrate the effectiveness of these methods of preparation in developing desirable adsorbent properties in the clay, Table 1 compares the decolorizing, ash removal, and pH properties of the materials produced in Examples 1 and 2 with those of bone black and of a sample made by retorting a clay-starch mixture.

TABLE 1
*Properties of several adsorbents*

| Adsorbent | Per cent color removed | Per cent ash removed | pH of filtrate |
|---|---|---|---|
| Bone black | 90.4 | 39.0 | 7.21 |
| Clay+10% starch, no phosphate | 88.0 | 15.0 | 5.30 |
| Example 1 | 93.1 | 38.6 | 6.61 |
| Example 2 | 97.8 | 50.6 | 7.42 |

As appears clearly from the foregoing data, the adsorbents produced in accordance with the present invention are superior to bone black in removal of coloring matter; that of Example 1 is at least equal to bone black in ash removing power, while that of Example 3 is superior in that regard. The buffering power of the product of Example 1 was slightly below the desired minimum, but is sufficient for some purposes, while the buffering power of the product of Example 2 is highly satisfactory for sugar refining use. Satsfactory hardness is produced also; for example, the product of Example 1 exhibited a hardness equal to that of good bone black. These materials are also capable of reactivation.

The following table compares the analysis of the product of Example 1 with that of the raw clay, both analyses being reported on the calcined basis. The analysis of the adsorbent typifies satisfactory practice of the invention.

TABLE 2

| Component | Per cent | |
|---|---|---|
| | Clay | Example 1 |
| $SiO_2$ | 61.91 | 42.60 |
| $TiO_2$ | 1.88 | 1.27 |
| $Al_2O_3$ | 34.02 | 25.17 |
| $P_2O_5$ | (1) | 11.27 |
| $Fe_2O_3$ | 1.04 | 0.15 |
| CaO | 0.24 | 17.84 |
| MgO | 0.28 | 0.68 |
| $R_2O$ | 0.56 | (2) |

[1] Negligible.
[2] Not det.

As indicated hereinabove, adsorbents possessing desirable properties may be produced using other lime and phosphate sources, and two such possible procedures are exemplified by the following examples.

*Example 3.*—240 grams of ball clay were mixed with 43.4 grams of lime, 69.0 grams of treble superphosphate, and 40 grams of starch. The mixture was dispersed in a liter of dilute ammonia as described in Example 3 and stirring was continued for 16 hours. From this point the procedure duplicated that described in Example 1.

*Example 4.*—180 grams of ball clay were mixed with 100.6 grams of dicalcium phosphate dihydrate, 51.2 grams of gypsum, and 30 grams of starch. The mixture was dispersed in a liter of dilute ammonia as in Examples 2 and 3 and stirring was continued for 44 hours. From this point the procedure adopted followed that described in Example 1.

The products of these two examples were superior in color removing power to those of Examples 1 and 2. Thus, compared with bone black having the efficiency reported in Table 1, the product of Example 3 removed 99 per cent of the color present in the sugar syrup, and that of Example 4 removed 95.6 per cent. These two products were somewhat inferior to those of Examples 1 and 2 in ash removing power, but their superior color removing ability manifestly adapts them to uses where that property is required in a high degree.

According to the provisions of the patent statutes, we have explained the principle and method of practicing our invention and have illustrated and described what we now consider to represent its best embodiment. However, we desire to have it understood that, within the scope of the appended claims, the invention may be practiced otherwise than as specifically illustrated and described.

We claim:

1. That method of making an adsorbent which comprises reacting, in the presence of water available lime and available phosphate in contact with clay and carbonizable organic matter to precipitate an insoluble basic phosphate which is more alkaline than hydroxyapatite, forming the product into shapes or granules, and heating the shaped particles to carbonize said organic matter and render the granules mechanically strong at a temperature below that at which the clay vitrifies.

2. That method of making an adsorbent which comprises reacting, in the presence of water available lime and available phosphate in contact with clay and carbonizable organic matter, to precipitate an insoluble basic phosphate which is more alkaline than hydroxyapatite, filtering and washing the filter cake free from water-soluble matter, forming the washed cake into shapes or granules, and heating the shaped particles in substantial absence of air to carbonize said organic matter and render the granules mechanically strong at a temperature below that at which the clay vitrifies.

3. That method of making an adsorbent which comprises reacting in an aqueous alkaline solution available lime and available phosphate in contact with clay and carbonizable organic matter, and thereby precipitating an insoluble basic phosphate which is more alkaline than hydroxyapatite, filtering and washing the filter cake free from water-soluble matter, forming the washed cake into shapes or granules, and drying and heating the shaped particles to carbonize said organic matter and render the granules mechanically strong at a temperature below that at which the clay vitrifies.

4. A method according to claim 3, said lime and phosphate being added in proportions equivalent to about 3 to 4 mols of CaO to each mol of $P_2O_5$.

5. A method according to claim 3, said lime and phosphate being added in proportions equivalent to about 3 to 4 mols of CaO to each mol of $P_2O_5$, and the sum of the total CaO and $P_2O_5$ present being equal to about 30 per cent by weight of the inorganic matter.

6. A method according to claim 3, said lime and phosphate being added in proportions equivalent to about 3 to 4 mols of CaO to each mol of $P_2O_5$, and said firing being in substantial absence of air.

7. That method of making an adsorbent which comprises suspending clay and carbonizable organic matter in an aqueous alkaline solution and adding thereto available lime and available phosphate, agitating the mixture for a period of time to permit said lime and phosphate to react with production of a basic phosphate, then filtering and freeing the filter cake from water-soluble matter, and heating the product to a temperature to carbonize said organic matter and harden the product but below that at which the clay vitrifies.

8. That method of making an adsorbent which comprises suspending a mixture of clay and carbonizable organic matter in a dilute aqueous alkaline solution, adding available lime and available phosphate thereto, agitating for a period of time to permit said lime and phosphate to react with production of an insoluble basic phosphate which is at least as alkaline as hydroxyapatite, then filtering and washing the filter cake free from water-soluble matter, then forming the washed material into shapes, drying and granulating the shaped material, and heating the dried granules in substantial absence of air to a temperature to carbonize said organic matter and harden the granules but below that at which the clay vitrifies.

9. That method of making an adsorbent which comprises suspending clay and carbonizable organic matter in a dilute aqueous alkaline solution, adding available lime and available phosphate thereto, agitating the mixture for a period of time to permit said lime and phosphate to react with production of an insoluble basic phosphate which is at least as alkaline as hydroxyapatite, then filtering and washing the filter cake free from water-soluble matter, drying and granulating the washed material, and heating the dried granules to a temperature to carbonize said organic matter and harden the granules but below that at which the clay vitrifies.

10. A method according to claim 9, said alkali being ammonium hydroxide, and said lime and phosphate being added in amounts equivalent to about 3 to 4 mols of CaO for each mol of $P_2O_5$.

11. A method according to claim 9, said carbonizable matter being a protein or a carbohydrate.

12. That method of making an adsorbent which comprises suspending clay and carbonizable protein or carbohydrate matter in a dilute solution of ammonium hydroxide, adding available lime and available phosphate thereto in amounts such as to be equivalent to about 3 to 4 mols of CaO per mol of $P_2O_5$, agitating for a period of time to permit said lime and phosphate to react with production of an insoluble basic phosphate which is at least as alkaline as hydroxyapatite, then filtering and washing the filter cake free from water-soluble matter, drying and granulating the washed material, and heating the dried granules in substantial absence of air to a temperature to carbonize said organic matter and harden the granules but below that at which the clay vitrifies.

13. That method of making an adsorbent which comprises suspending clay and carbonizable protein or carbohydrate matter in a dilute solution of ammonium hydroxide, adding available lime and available phosphate thereto in amounts equivalent to 3 mols of CaO per mol of $P_2O_5$, and such that the sum of CaO and $P_2O_5$ present is at least about 30 per cent of the total inorganic matter, agitating for a period of time to permit said lime and phosphate to react with production of an insoluble basic phosphate which is at least as alkaline as hydroxyapatite, then filtering and washing the filter cake free from water-soluble matter, and drying and heating the product in substantial absence of air to a temperature to carbonize said organic matter and harden the granules but below that at which the clay vitrifies.

14. A method according to claim 13, said clay being a ball clay.

15. A method according to claim 13, said clay being a ball clay, and said solution containing about 3 per cent of $NH_3$.

16. As a new article of manufacture, a clay base adsorbent comprising fired granules of clay having distributed uniformly therethrough carbon and a basic calcium phosphate, said carbon and phosphate having been formed in contact with said clay, and said granules having power to decolorize raw sugar solutions at least equivalent to that of bone black of the grade used for refining raw sugar solution.

17. As a new article of manufacture, a clay base adsorbent comprising fired but non-vitrified granules of clay having distributed uniformly therethrough carbon and a water-insoluble basic calcium phosphate which is more basic than hydroxyapatite, said carbon and phosphate having been formed in contact with said clay, and said granules having power to decolorize and having alkaline buffering action upon raw sugar solutions at least equivalent to those of bone black of the grade used for refining raw sugar solution.

18. As a new article of manufacture, a clay base adsorbent comprising fired but non-vitrified granules of clay having distributed uniformly therethrough carbon and a water-insoluble basic calcium phosphate which is more basic than hydroxyapatite and in which the mol ratio CaO to $P_2O_5$ is between about 3 to 1 and 4 to 1, said carbon and phosphate having been formed in contact with said clay, and said granules having color-removing adsorbent power.

19. As a new article of manufacture, a clay adsorbent comprising fired but non-vitrified granules of ball clay having distributed uniformly therethrough carbon and a water-insoluble basic calcium phosphate which is more basic than hydroxyapatite, said phosphate comprising about 30 per cent by weight of the total inorganic matter present and having a CaO to $P_2O_5$ mol ratio between about 3 to 1 and 4 to 1, said carbon and phosphate having been formed in contact with said clay, and said granules having power to adsorb color and solid matter from solution.

ELLIOTT P. BARRETT.
JAMES R. WEST.